(12) United States Patent
Onda et al.

(10) Patent No.: US 12,248,339 B2
(45) Date of Patent: Mar. 11, 2025

(54) ELECTRONIC APPARATUS

(71) Applicant: LENOVO (SINGAPORE) PTE. LTD., Singapore (SG)

(72) Inventors: Yuichi Onda, Yokohama (JP); Kazuo Fujii, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 56 days.

(21) Appl. No.: 18/357,353

(22) Filed: Jul. 24, 2023

(65) Prior Publication Data

US 2024/0036613 A1 Feb. 1, 2024

(30) Foreign Application Priority Data

Jul. 28, 2022 (JP) .................. 2022-120565

(51) Int. Cl.
*G06F 1/16* (2006.01)
(52) U.S. Cl.
CPC .................. *G06F 1/1658* (2013.01)
(58) Field of Classification Search
CPC .... G06F 1/1658; G06F 1/1626; G06F 1/1637; G06F 1/1656; G06F 1/1616; G06F 1/1662; H01R 12/91; H01R 12/716; H01R 13/6205; H01R 13/631
See application file for complete search history.

(56) References Cited

U.S. PATENT DOCUMENTS 6,252,768 B1 * 6/2001 Lin .................. G06F 1/1656
361/679.55

FOREIGN PATENT DOCUMENTS

| CN | 216557042 U | * | 5/2022 |
| JP | 6373698 A | | 4/1988 |
| JP | 2017045853 A | | 3/2017 |
| JP | 2018014428 A | | 1/2018 |

* cited by examiner

*Primary Examiner* — Abhishek M Rathod
*Assistant Examiner* — Keon Kim
(74) *Attorney, Agent, or Firm* — SHIMOKAJI IP

(57) ABSTRACT

An electronic apparatus includes a housing which has an opening in one face, a cover member which is detachably coupled to the housing and closes the opening in the housing, a first board which is housed in the housing, a second board which is supported to the cover member, a first connector which is mounted on the first board and is fixed to the housing relatively and a second connector which is mounted on the second board, is supported to the cover member in a floating state and is connected with the first connector in a state that the cover member is coupled to the housing.

6 Claims, 11 Drawing Sheets

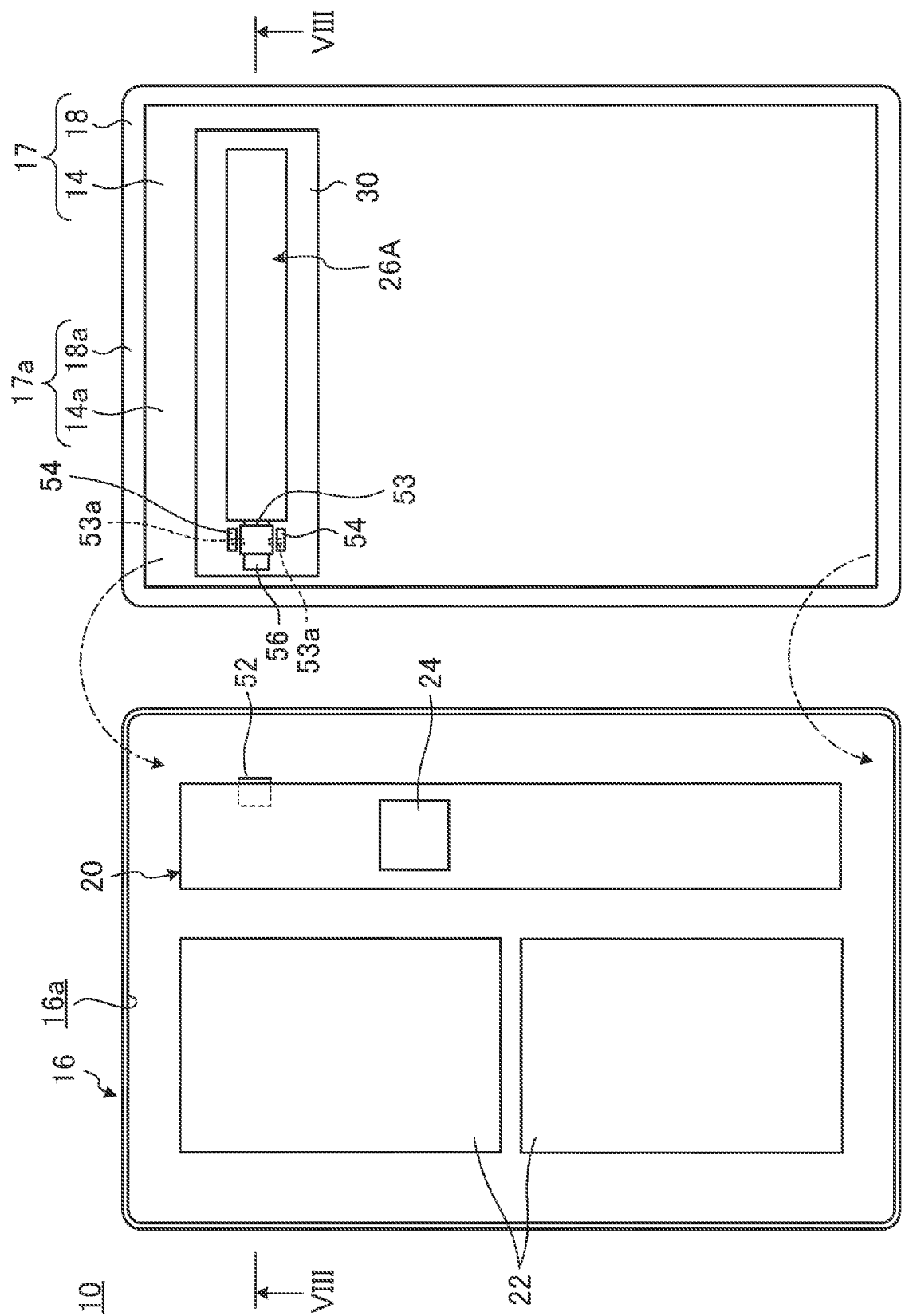

ELECTRONIC APPARATUS

BACKGROUND OF THE INVENTION

Field of the Invention

The present invention relates to an electronic apparatus which includes connectors which connect boards together.

Description of the Related Art

An electronic apparatus such as a laptop PC or a tablet PC has a configuration which includes a housing which houses a motherboard that a CPU and so forth are mounted as a chassis and a cover member which closes an opening in the housing (see, for example, Japanese Patent No. 6212522 and Japanese Patent No. 6649854) are included.

SUMMARY OF THE INVENTION

The electronic apparatus such as the above-mentioned one has such a configuration that an electronic component such as a keyboard, a display or the like is attached to the cover member. The electronic apparatus which is configured in this way needs a board-to-board (B to B) connector which is used to connect a control board for the electronic component or a flexible board which is connected to the electronic component and a motherboard together.

In general, the existing electronic apparatus such as the above has such a structure that, at first, a cover member-side connector which is mounted on an elongated flexible board which is connected to the electronic component or the control board of the electronic component is connected to a motherboard-side connector and then the connector is fixed by screwing which is performed by using another component or the connector is pressed with the use of an elastic material such as a sponge and so forth so as to prevent the connector from falling down and slipping out and then the cover member is coupled to the housing. Accordingly, in this configuration, it is necessary to perform work of housing the flexible board in a folded state in order to prevent the elongated flexible board from being sandwiched between the cover member and the housing and from being caught after connection of the connectors.

Accordingly, in the above configuration, time and effort are taken to perform work of coupling the cover member and the housing together. Further, in the above configuration, in a case where the cover member is removed from the housing at the time of maintenance and so forth, it is feared that the flexible board would be caught in another member and would be damaged.

The present invention has been made in consideration of the issue of the prior art and aims to provide an electronic apparatus which makes it possible to perform connection of the connectors which mutually connect the boards and to perform coupling between the cover member and the housing efficiently and to suppress occurrence of malfunctions at the time of maintenance.

The electronic apparatus according to the first aspect of the present invention includes a housing which has an opening in one face; a cover member which is detachably coupled to the housing and closes the opening in the housing, a first board which is housed in the housing, a second board which is supported to the cover member, a first connector which is mounted on the first board and is fixed to the housing relatively and a second connector which is mounted on the second board, is supported to the cover member in a floating state and is connected with the first connector in a state that the cover member is coupled to the housing.

According to the aspect of the present invention, it becomes possible to efficiently connect together the connectors which mutually connect the boards and to couple the cover member and the housing together and, in addition, to suppress occurrence of the malfunctions at the time of maintenance.

BRIEF DESCRIPTION OF THE DRAWINGS

FIG. 7 is a schematic diagram illustrating one example of an inner structure of an electronic apparatus according to a second embodiment of the present invention.

DETAILED DESCRIPTION OF THE INVENTION

In the following, an electronic apparatus pertaining to the present invention will be described in detail by giving preferred embodiments thereof with reference to the appended drawings.

Figure 1:
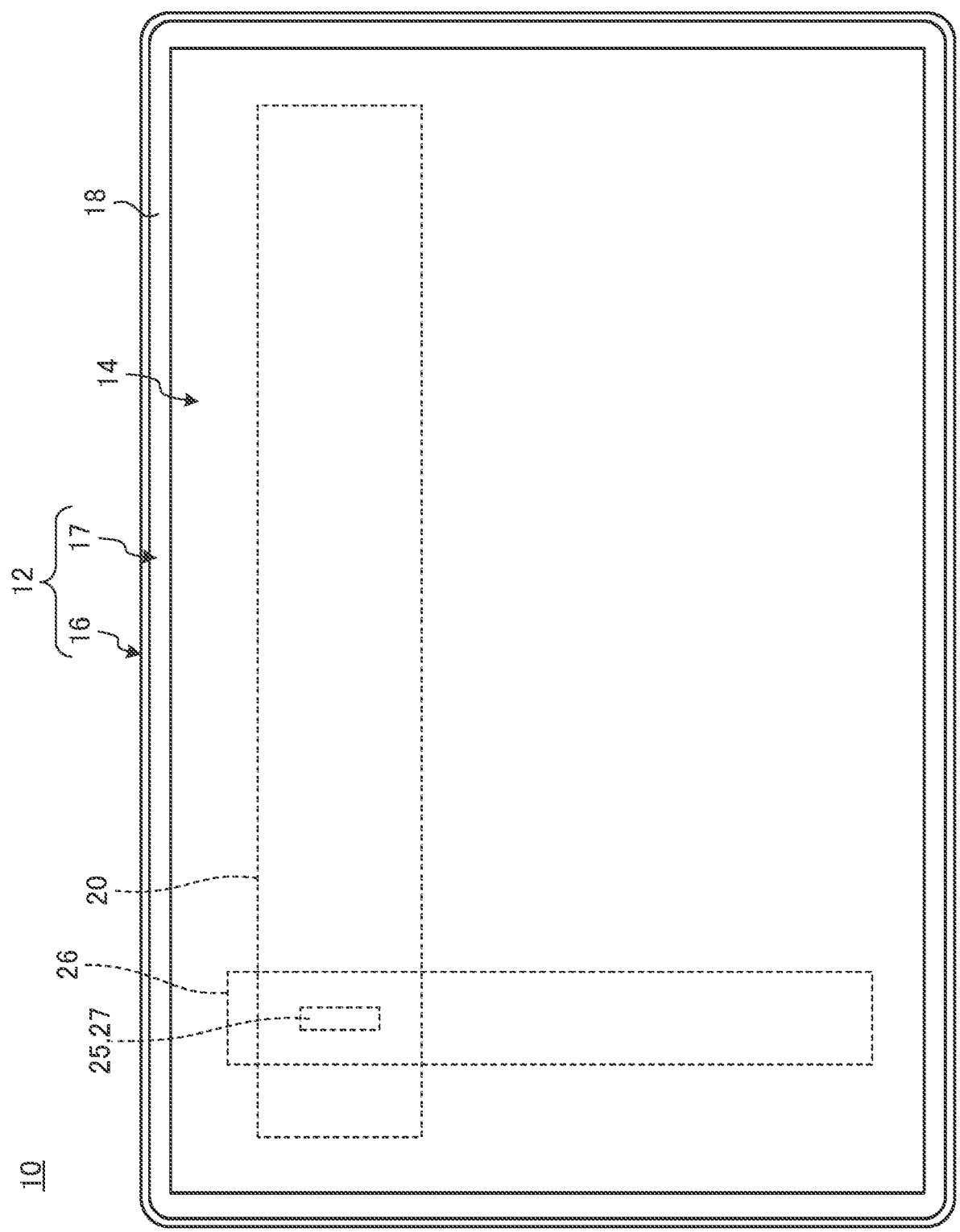
FIG. 1 is a plan view illustrating one example of an electronic apparatus according to a first embodiment of the present invention.

FIG. 1 is a plan view illustrating one example of an electronic apparatus 10 according to a first embodiment of the present invention. The electronic apparatus 10 according to the first embodiment of the present invention exemplifies a tablet-type PC. As illustrated in FIG. 1, the electronic apparatus 10 includes a chassis 12 and a display 14 which faces the front face of the chassis 12. A housing 16 and a cover member 17 are coupled together to be detachable and thereby the chassis 12 is configured in the form of a flatten box as a whole.

Figure 2:
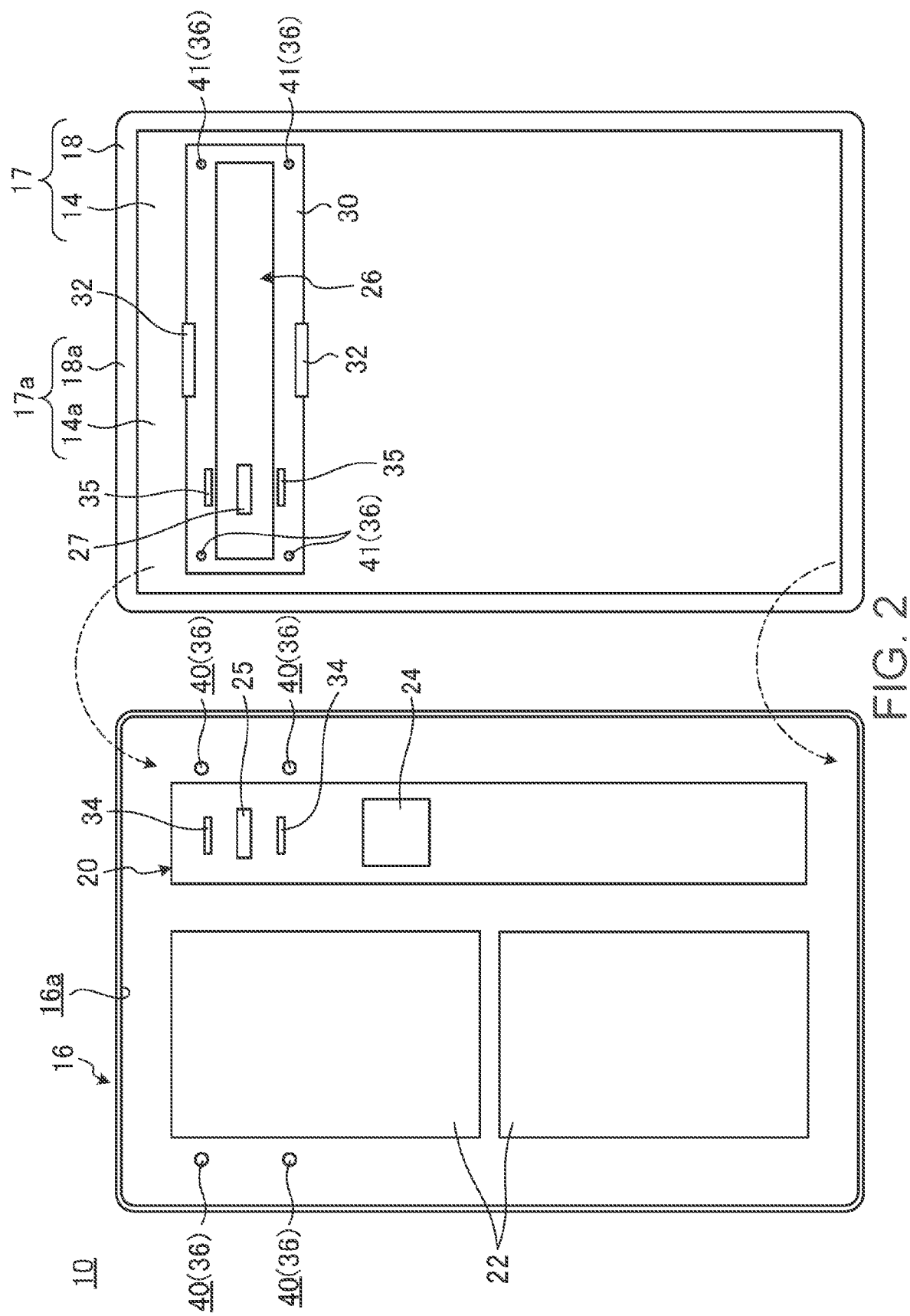
FIG. 2 is a schematic diagram illustrating one example of an inner structure of the electronic apparatus.

FIG. 2 is a schematic diagram illustrating one example of an inner structure of the electronic apparatus 10. FIG. 2 is the diagram that the housing 16 is viewed from the front-face side and the cover member 17 is viewed from the side that an inner face 17a of the cover member 17 is located in a state that the cover member 17 is removed from the housing 16.

As illustrated in FIG. 1 and FIG. 2, the housing 16 has a shallow bathtub form which covers the electronic apparatus 10 ranging from the rear face to the outer peripheral side face of the electronic apparatus 10. The cover member 17 has the display 14 and a vessel 18 which surrounds an outer peripheral edge of the display 14 and has a plate shape as a whole. The cover member 17 closes an opening 16a which is formed in the front face of the housing 16. The housing 16 and the vessel 18 are made of, for example, metal or a resinous material. The display 14 is made from, for example, an organic EL material or a liquid crystal material and is a touch panel type display.

A first board 20 and a battery device 22 are housed in the housing 16. Further, also a memory, an SSD (Solid State Drive), an antenna module and so forth are housed in the housing 16. The first board 20 is a motherboard of the electronic apparatus 10 and a CPU (Central Processing Unit) 24 and a first connector 25 are mounted on the first board 20. Further, various semiconductor chips, connection terminals and so forth are mounted on the first board 20.

The inner face 17a of the cover member 17 is configured by an inner face 18a of the vessel 18 and a rear face 14a of the display 14. A second board 26 is installed on the side that an inner face 17a of the cover member 17 is located. The second board 26 is a control board which controls a displaying operation of the display 14 and is connected with the display 14 via a predetermined flexible board. A second connector 27 is mounted on the second board 26.

The connectors 25 and 27 are board-to-board (B to B) connectors. In the electronic apparatus 10 according to the first embodiment of the present invention, in a case where the cover member 17 is coupled to the housing 16, the connectors 25 and 27 are automatically connected together and thereby the second board 26 and the first board 20 are electrically connected together.

Next, a connection structure of the connectors 25 and 27 will be described.

Figure 3:
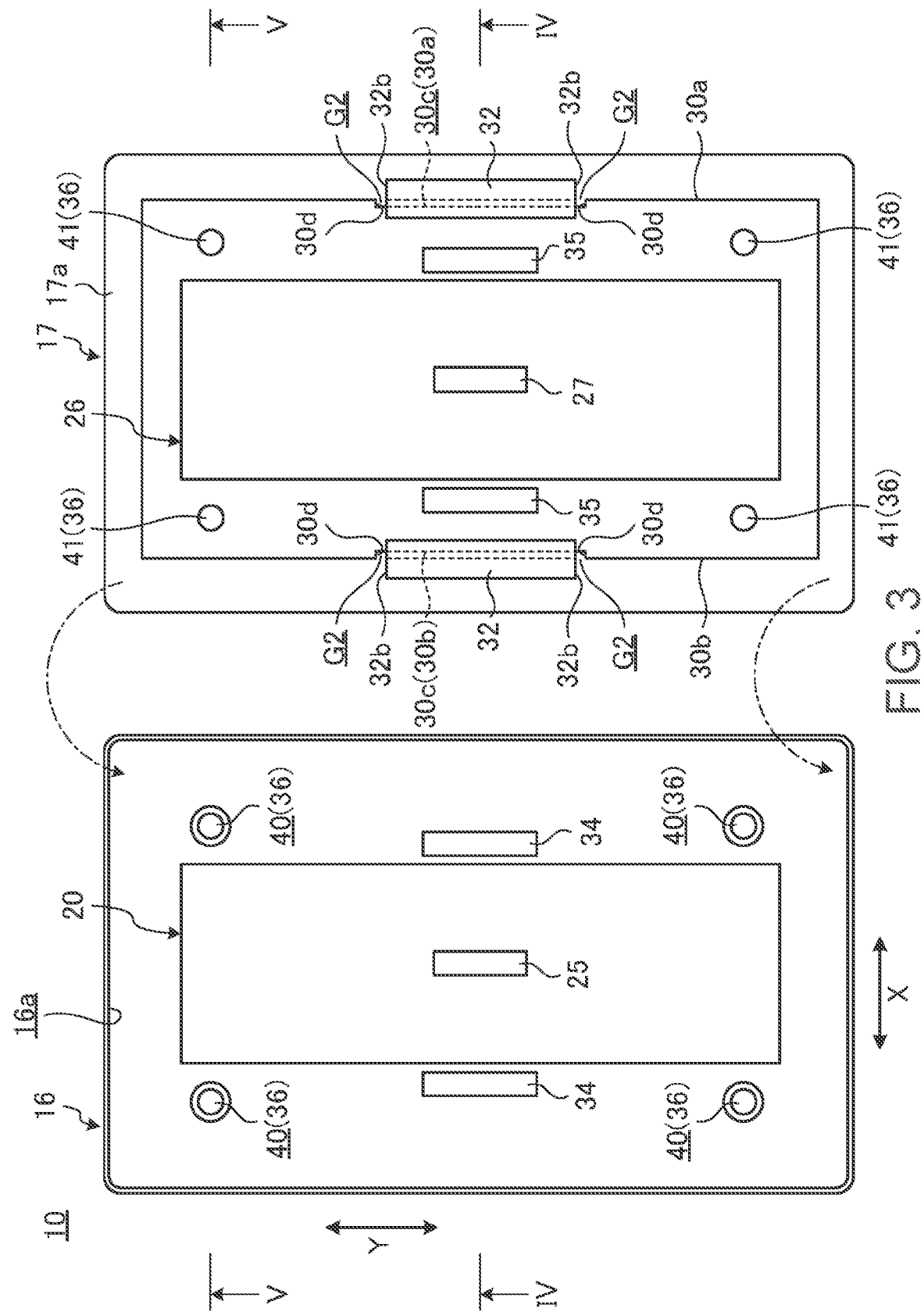
FIG. 3 is a model diagram illustrating one example of a configuration of connectors and peripheral portions thereof in a simplified form.
Figure 4:
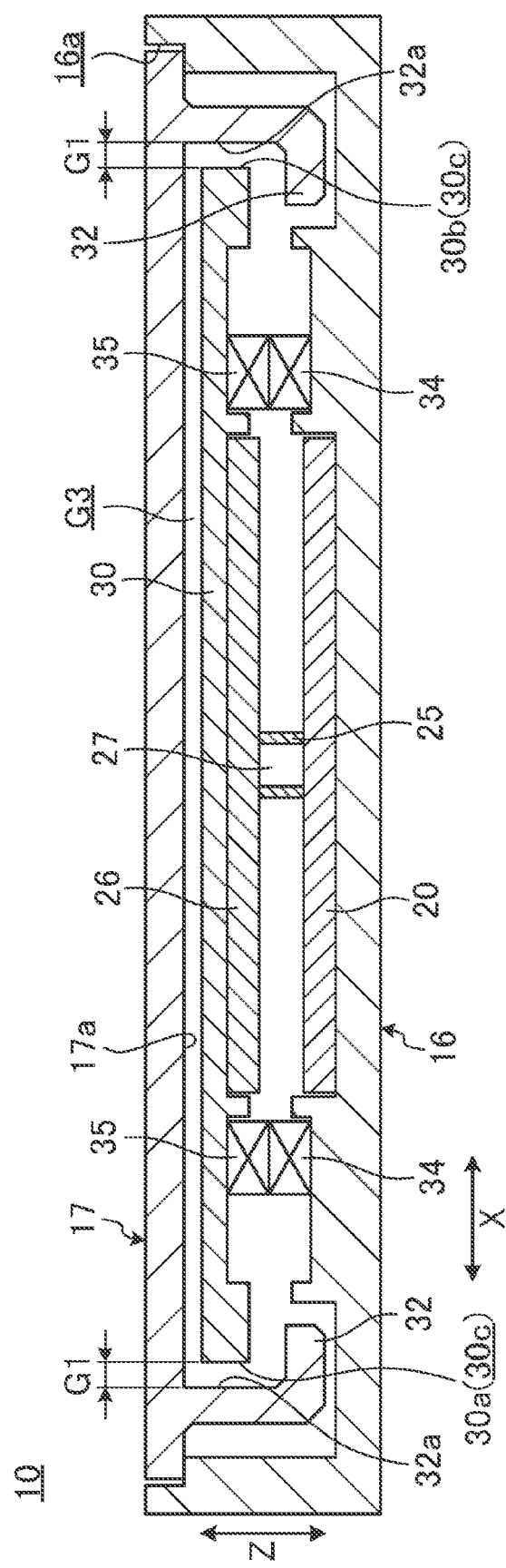
FIG. 4 is a schematic sectional diagram illustrating one example of the electronic apparatus which is taken along the IV-IV line in FIG. 3.
Figure 5A:
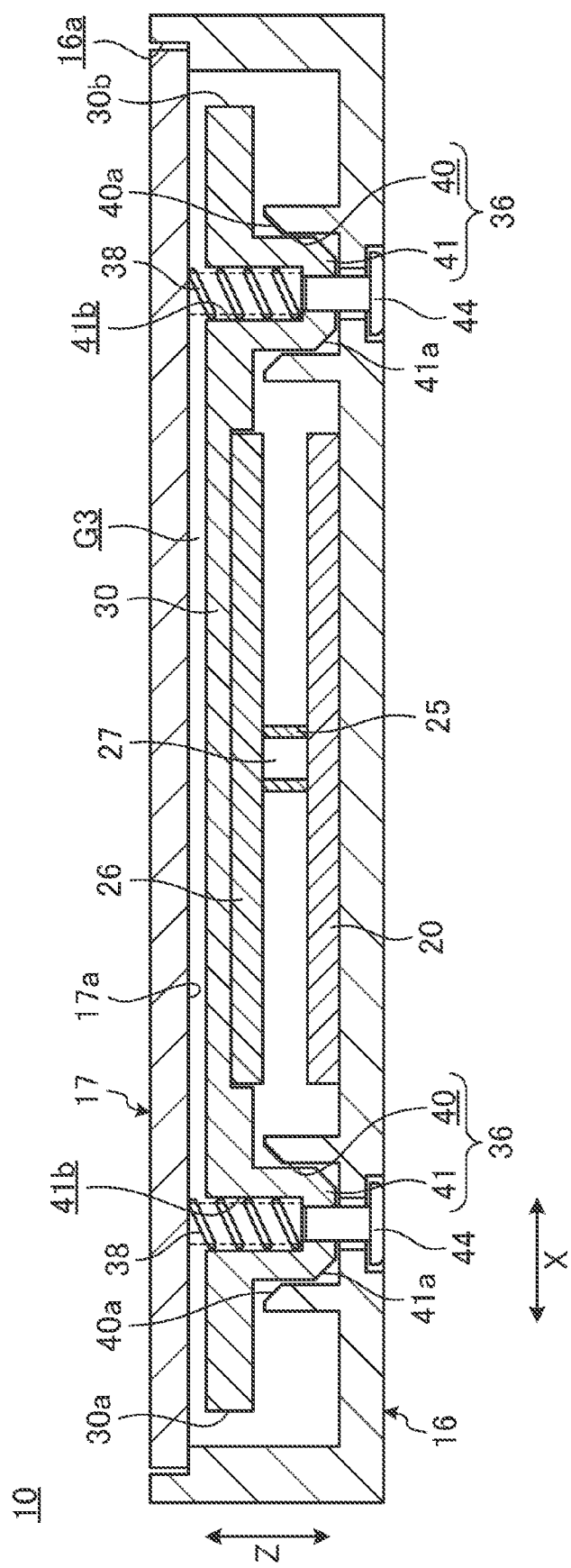
FIG. 5A is a schematic sectional diagram illustrating one example of the electronic apparatus which is taken along the V-V line in FIG. 3.
Figure 5B:
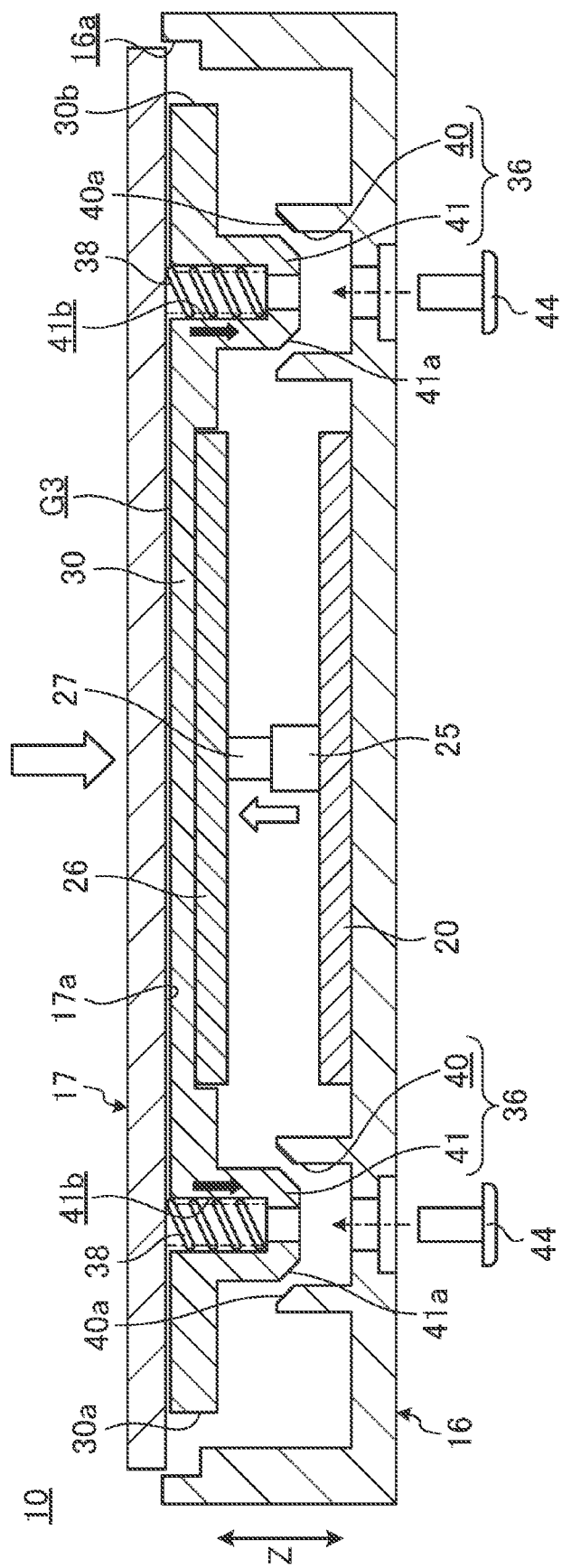
FIG. 5B is an exploded diagram illustrating one example of an operation of attaching a cover member to a housing which is illustrated in FIG. 5A.

FIG. 3 is a model diagram illustrating one example of a configuration of the connectors 25 and 27 and their peripheral portions in a simplified form. That is, FIG. 3 is the diagram illustrating the housing 16 and the cover member 17 which are illustrated in FIG. 2 and configurational elements for automatically connecting together the boards 20 and 26 and the connectors 25 and 27 which are loaded on the housing 16 and the cover member 17 in one-to-one correspondence as a schematic model. FIG. 4 is a schematic sectional diagram which is taken along the IV-IV line in FIG. 3. FIG. 5A is a schematic sectional diagram which is taken along the V-V line in FIG. 3. FIG. 5B is an exploded diagram illustrating one example of an operation of attaching the cover member 17 to the housing 16 which is illustrated in FIG. 5A. In FIG. 3 to FIG. 5B, illustration of the display 14 and the vessel 18 is omitted and the cover member 17 is illustrated as one plate.

In the following, the chassis 12 and the respective constitutional elements which are loaded on the chassis 12 will be described by calling directions which follow plane directions of the housing 16 and the cover member 17 as an X direction and a Y direction respectively and calling a direction that the housing 16 and the cover member 17 are laminated as a Z direction.

First, a structure for supporting the connector 25 on the housing 16 and supporting the connector 27 on the cover member 17 will be described.

As illustrated in FIG. 3 to FIG. 5A, the first board 20 is housed in the housing 16 and is fixed to the housing 16. Therefore, the first connector 25 which is mounted on the first board 20 is fixed to the housing 16 relatively.

The second board 26 is supported in a floating state relative to the cover member 17. In the first embodiment, the second board 26 is fixed to a holder plate 30 which is supported in the floating state in the X and Y directions relative to the cover member 17. The holder plate 30 is, for example, a resin plate.

For example, one pair of hooks 32 is projectingly installed on the inner face 17a of the cover member 17 as illustrated in FIG. 3. The respective hooks 32 are almost L-shaped board pieces which are so bent as to mutually confront and are so installed as to make it possible to hold left and right edges 30a and 30b of the holder plate 30 which extend in the Y direction so as to embrace the left and right edges 30a and 30b. An inner wall 32a of each hook 32 which extends in the Z direction is arranged in a state of leaving a gap G1 between itself and each of the edges 30a and 30b of the holder plate 30 as illustrated in FIG. 4. The holder plate 30 has a notch-shaped recessed portion 30c in a part which is embraced by the hook 32. The gap G1 is a gap between the inner wall 32a of the hook 32 and each of the edges 30a and 30b of the recessed portion 30c also as illustrated in FIG. 4. In addition, one pair of corners 30d which is formed in the recessed portion 30c is arranged in a state of leaving a gap G2 between each corner 30d and each of the one pair of side walls 32b which extends in the Z direction of each hook 32 as illustrated in FIG. 3.

The second board 26 which is fixed to the holder plate 30 is movable in the X direction relative the inner face 17a of the cover member 17 with the aid of the gap G1 and is movable in the Y direction relative to the inner face 17a with the aid of the gap G2. Thereby, the second board 26 is supported to the cover member 17 in a state of floating in the X and Y directions. Accordingly, the second connector 27 which is mounted on the second board 26 is supported to the cover member 17 in the floating state.

Next, a structure for connecting together the connectors 25 and 27 more smoothly will be described.

As illustrated in FIG. 3 to FIG. 5A, the electronic apparatus 10 includes first magnets 34, second magnets 35, positioning parts 36 and elastic bodies 38.

One pair of the first magnets 34 is so disposed as to stride over the first connector 25 in a crosswise direction and is fixed to the housing 16 respectively. One pair of the second magnets 35 is so disposed as to stride over the second connector 27 in the crosswise direction and is fixed to the inner face 17a of the cover member 17 respectively. The magnets 34 and 35 are located at positions so that the magnets 34 and 35 mutually overlap in the Z direction in a state that the cover member 17 is coupled to the housing 16 and generate attraction force therebetween. That is, the magnets 34 and 35 generate the attraction force which acts in a direction that the connectors 25 and 27 are mutually connected and perform sure connection and retaining of the connectors 25 and 27. Although it is possible to appropriately change the number of the magnets 34 and 35 to be installed and the installation positions of the magnets 34 and 35, it is preferable to install the magnets 34 and 35 at positions which are as close as possible to the connectors 25 and 27 respectively.

The positioning parts 36 are adapted to position the connectors 25 and 27 relatively in the X and Y directions which are orthogonal to a connection direction (the Z direction) that the connectors 25 and 27 are connected together. The positioning parts 36 are configured by a plurality of recessed portions 40 and a plurality of protruding portions 41.

Each recessed portion 40 is a hole which is formed in the center of a cylindrical projection which projects from the inner face of the housing 16. The recessed portions 40 are so arranged as to surround the first connector 25 in a rectangular form and surround the first connector 25 from the four sides. A chamfered tapered face 40a is formed on an opening end peripheral edge of each recessed portion 40.

Each protruding portion 41 is a cylindrical projection which protrudes from the inner face of the holder plate 30. The protruding portions 41 are so arranged as to surround the second connector 27 in a rectangular shape and surround the second connector 27 from the four sides. A chamfered tapered face 41a is formed on a leading end peripheral edge of each protruding portion 41.

The recessed portions 40 and the protruding portions 41 are located at positions such that the recessed portions 40 and the protruding portions 41 mutually overlap in the Z direction in a state that the cover member 17 is coupled to the housing 16. Thereby, in a case where the cover member 17 is coupled to the housing 16, the protruding portions 41 fit into the recessed portions 40 and thereby position the connectors 25 and 27. It is possible to appropriately change the numbers of the recessed portions 40 and the protruding portions 41 to be installed and installation positions of the recessed portions 40 and the protruding portions 41. As an alternative, the recessed portions 40 may be installed on the cover member 17 side and the protruding portions 41 may be installed on the housing 16 side.

The recessed portion 40 and the protruding portion 41 are extremely small in tolerance between their mutually fitting portions in the Z direction. On the other hand, the recessed portion 40 and the protruding portion 41 have fit tolerances in the X and Y directions owing to presence of the tapered faces 40a and 41a. The tolerance of the positioning portion 36 is smaller than a floating distance of the second connector 27 relative to the cover member 17 owing to the presence of the gaps G1 and G2. Thereby, in a case where the cover member 17 is coupled to the housing 16, it becomes possible to fit each protruding portion 41 into each recessed portion 40 and then to smoothly connect together the connectors 25 and 27 within the range of the floating tolerance.

The elastic body 38 is, for example, a compression coil. Each cylindrical hole 41b is formed in each protruding portion 41. Each elastic body 38 is inserted into each cylindrical hole 41b in each protruding portion 41. The elastic body 38 has an equilibrium length which makes it possible for an upper end of the elastic body 38 to protrude upward from the cylindrical hole 41b in a no-load-exerted state which is illustrated in FIG. 5A. On this occasion, a gap G3 which is, for example, about 1 mm in Z-direction height is formed between the inner face 17a of the cover member 17 and the upper face of the holder plate 30.

Next, an operation of coupling the cover member 17 to the housing 16 and connecting together the connectors 25 and 27 simultaneously will be described.

FIG. 5B illustrates one example of a state that in a case where the cover member 17 is attached to the housing 16 from above so as to close the opening 16a, the second connector 27 begins to abut on the connector 25. It is preferable to apply a certain amount of fitting force for connection between the connectors 25 and 27. Therefore, as illustrated in FIG. 5B, in a case where the second connector 27 abuts on the first connector 25, the second connector 27, the second board 26 and the holder plate 30 receive reaction force of abutment and are pushed back upward and thereby the elastic body 38 is compressed. On the contrary, the elastic body 38 pushes the holder plate 30 downward with the aid of elastic force which is generated by compression. Thereby, the second connector 27 is gradually fitted into the first connector 25.

Then, in a case where the magnets 34 and 35 come closer to each other to some extent, also the attraction force between the magnets 34 and 35 is applied and thereby the second connector is more fitted into the first connector 25. Then, in a case where the cover member 17 is coupled to the housing 16, also the second connecter 27 fits into the first connector 25 completely (see FIG. 5A). Here, as illustrated in FIG. 5A, at the completion of connection between the connectors 25 and 27, the length of the elastic body 38 returns to the free length. Accordingly, the elastic body 38 does not apply the excessive pressing force to the connectors 25 and 27 the connection of which is completed.

As illustrated in FIG. 5A and FIG. 5B, for example, a screw hole may be formed in a leading end face of the protruding portion 41, a through hole which extends down to the lower face of the housing 16 may be formed in the bottom of the recessed portion 40 and the housing 16 and the cover member 17 may be clamped together with screws 44 via these through holes and screw holes.

As described above, in the electronic apparatus 10 according to the first embodiment of the present invention, the first connector 25 which is mounted on the first board 20 is fixed to the housing 16 relatively and the second connector 27 which is mounted on the second board 26 is supported to the cover member 27 in the floating state.

Accordingly, in the electronic apparatus 10, in a case where the cover member 17 is coupled to the housing 16, relative positions of the connectors 25 and 27 are adjusted by a floating operation of the second connector 27 and the connectors 25 and 27 are automatically connected together. That is, in the electronic apparatus 10, the connectors 25 and 27 are connected together simply by coupling the cover member 17 to the housing 16.

That is, in work of coupling together the housing 16 and the cover member 17 so as to configure the chassis 12, the housing 16 that the first board 20 which serves as a motherboard and the battery device 22 are loaded is set as the main body and the cover member 17 that the display 14 which is the electronic component is loaded is so attached to the housing 16 as to close the opening 16a in the housing 16. Here, the sizes of the connectors 25 and 27 are remarkably smaller (see FIG. 2) than the sizes of the housing 16 and the cover member 17. However, in the existing electronic apparatus, in a case where the cover member 17 is to be coupled to the housing 16, it is difficult to align one connector 25 with another connector 27 and, therefore, a configuration that a flexible board which is sufficiently long is connected to the second board 26 and the second connector 27 is mounted on the tip thereof is generally used.

On the other hand, in the electronic apparatus 10 according to the first embodiment of the present invention, the first connector 25 which is installed on the housing 16 which serves as the main body of the chassis 12 is fixed to the housing 16 relatively and the second connector 27 which is installed on the cover member 17 which serves as the cover of the chassis 12 is supported to the cover member 17 in the floating state. Thereby, in the electronic apparatus 10, when attaching the cover member 17 to the housing 16, the second connector 27 which is supported to the cover member 17 in the floating state is smoothly aligned with the first connector 25 and is connected to the first connector 25. Accordingly, in the electronic apparatus 10, the elongated flexible board is not arranged between the cover member 17 and the housing 16 in the striding-over state and therefore it becomes possible to connect the connectors 25 and 27 together and to couple the cover member 17 and the housing 16 together efficiently. Further, since there exists no flexible board which is installed between the cover member 17 and the housing 16 in the striding-over state, in a case where the cover member 17 is removed from the housing 16 at the time of maintenance and so forth, such a situation that the flexible substrate is damaged does not occur.

In the first embodiment, the second board 26 is supported in a state of leaving the gap G3 between the second board 26 itself and the inner face 17a of the cover member 17 and is formed to be floatable along the inner face 17a as illustrated in FIG. 5A. Then, as an alternative, the electronic apparatus 10 may also include the elastic body 38 which is installed in the gap G3 and actuates the second board 26, that is, the second connector 27 in a direction that the second board 26, that is, the second connector 27 is separated from the inner face 17a of the cover member 17. Then, in the electronic apparatus 10, in a case where the second connector 27 abuts on the first connector 2c, the elastic body 38 receives counterforce which is generated against fitting force which is used for connection between the first connector 25 and the second connectors 27 and is compressed. As a result, since the second connector 27 receives downward acting elastic force from the elastic body 38 while being pushed back above the second board 26 and is pressed against the first connector 25 while being pushed back above the second substrate 26, the connectors 25 and 27 are connected together more surely as illustrated in FIG.

The electronic apparatus 10 may further include the first magnet 34 which is fixed to the first board 20 relatively and the second magnet 35 which is fixed to the second board 26 relatively and generates the attraction force which works in a direction that the second connector 27 is connected to the first connector 25 between the first magnet 34 and the second magnet 35. Thereby, it becomes possible to connect the connectors 25 and 27 together more smoothly with the aid of the attraction force between the magnets 34 and 35. In addition, since the electronic apparatus 10 makes it possible to mutually fit the connectors 25 and 27 with the aid of elastic force of the elastic body 38, it becomes possible to minimize the attraction force between the magnets 34 and 35 and downsizing of the electronic apparatus 10 becomes possible. That is, since the attraction force between the magnets 34 and 35 is weak, in a case where the cover member 17 is detached from the housing 16, it becomes also easy to separate the magnets 34 and 35 from each other. In the electronic apparatus 10, the magnets 34 and 35 and the positioning portion 36 may be installed on the connectors 25 and 27 similarly to connectors 52 and 53 of an electronic apparatus 50 which will be described later.

Incidentally, for example, in a case where the electronic apparatus 10 is subject to shock which is induced by falling and so forth, there is also the possibility that the cover member 17 would warp and the second connector 27 would be disconnected from the first connector 25 temporarily. In this respect, in the electronic apparatus 10, the magnets 34 and 35 generate the attraction force continuously even after the cover member 17 has been coupled to the housing 16. Accordingly, even in a case where the connector 25 is disconnected from the connector 27 temporarily, the connector 25 is again connected with the connector 27 with the aid of the attraction force between the magnets 34 and combined with a floating action of the second connector 27 and the elastic force of the elastic body 38. As described above, the electronic apparatus 10 makes it possible to suppress also occurrence of such a malfunction that the connectors 25 and 27 are brought into a state of being disconnected from each other completely due to falling and so forth.

The electronic apparatus 10 also includes the positioning portion 36 which positions the first connector and the second connector 27 in the X and Y directions which are orthogonal to the direction (the Z direction) that the first connector 25 and the second connector 27 are mutually connected. Accordingly, connection between the second connector 27 which is supported to the cover member 17 in the floating state and the first connector 25 which is fixed to the housing 16 becomes more definitely.

Incidentally, in the electronic apparatus 10, in a case where, for example, the housing 16, the first board 20, the cover member 17, the holder plate 30, the second board 26 and so forth are so configured as to have sufficiently high rigidity, some or all of the elastic body 38, the magnets 34 and 35, the positioning portion 36 and so forth may be omitted. That is, in this case, when coupling the cover member 17 to the housing 16, respective members such as the housing 16 and so forth hardly warp and therefore the positions of the connectors 25 and 27 in the Z direction almost never change. Accordingly, in a case where the cover member 17 comes closer to the housing 16 gradually, also the second connector 27 is fitted into the first connector 25 gradually. Then, also in this case, since the second connector 27 is automatically positioned to the first connector 25 with the aid of the floating action, it becomes possible to automatically connect the first connector 25 and the second connector 27 together.

Figure 6:
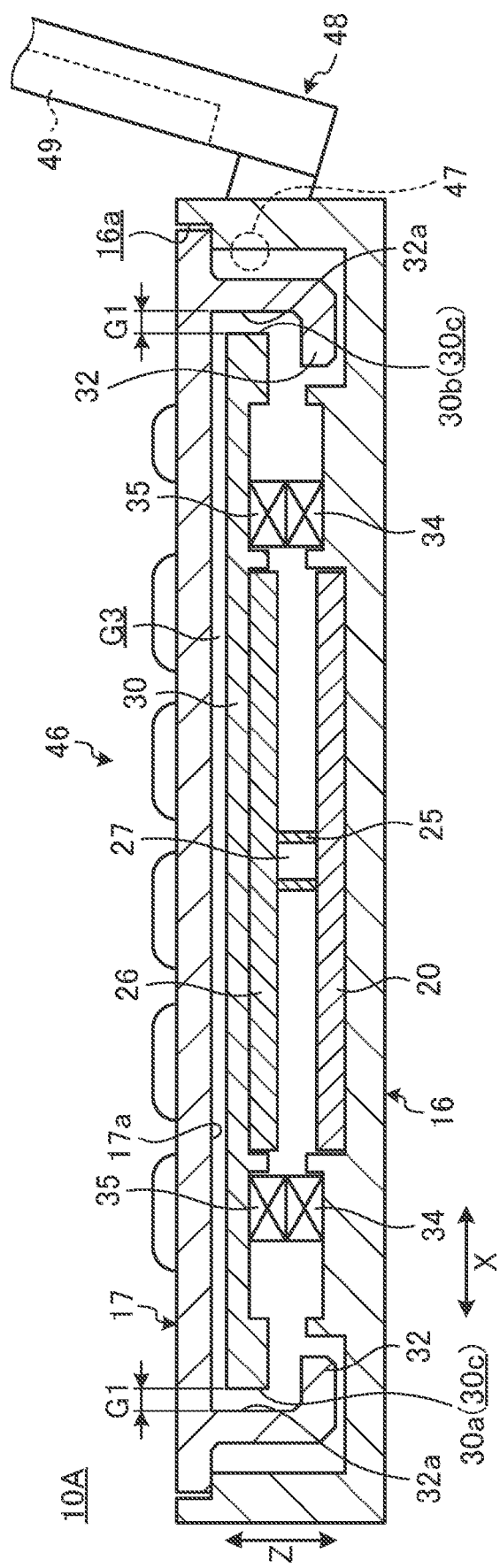
FIG. 6 is a schematic side sectional diagram illustrating one example of an electronic apparatus pertaining to a modified example of the electronic apparatus according to the first embodiment of the present invention.

FIG. 6 is a schematic side sectional diagram illustrating one example of an electronic apparatus 10A pertaining to one modified example of the electronic apparatus 10 according to the first embodiment of the present invention.

Although in FIG. 1 to FIG. 5, the tablet PC type electronic apparatus 10 is exemplified, it is also possible to apply the connecting structure of the connectors 25 and 27 also to the laptop PC type electronic apparatus 10A.

As illustrated in FIG. 6, the cover member 17 of the electronic apparatus 10A loads a keyboard 46 which functions as an electronic component in place of the display 14. The second board 26 of the electronic apparatus 10A is, for example, a control board for the keyboard 46. In the electronic apparatus 10A, a display chassis 48 is coupled to one end of the chassis 12 via a hinge 47. A display 49 which is the same as the display 14 is loaded on the front face of the display chassis 48.

Also, in the electronic apparatus 10A which is configured in this way, the connectors 25 and 27 are automatically connected together simply by coupling the cover member 17 to the housing 16. Accordingly, also in the electronic apparatus 10A, it becomes possible to connect together the connectors 25 and 27 and to couple together the cover member 17 and the housing 16 efficiently and, in addition, it becomes also possible to suppress occurrence of the malfunctions when removing the cover member 17 from the housing 16 at the time of maintenance and so forth.

Next, an electronic apparatus 50 according to the second embodiment of the present invention will be described.

Figure 8A:
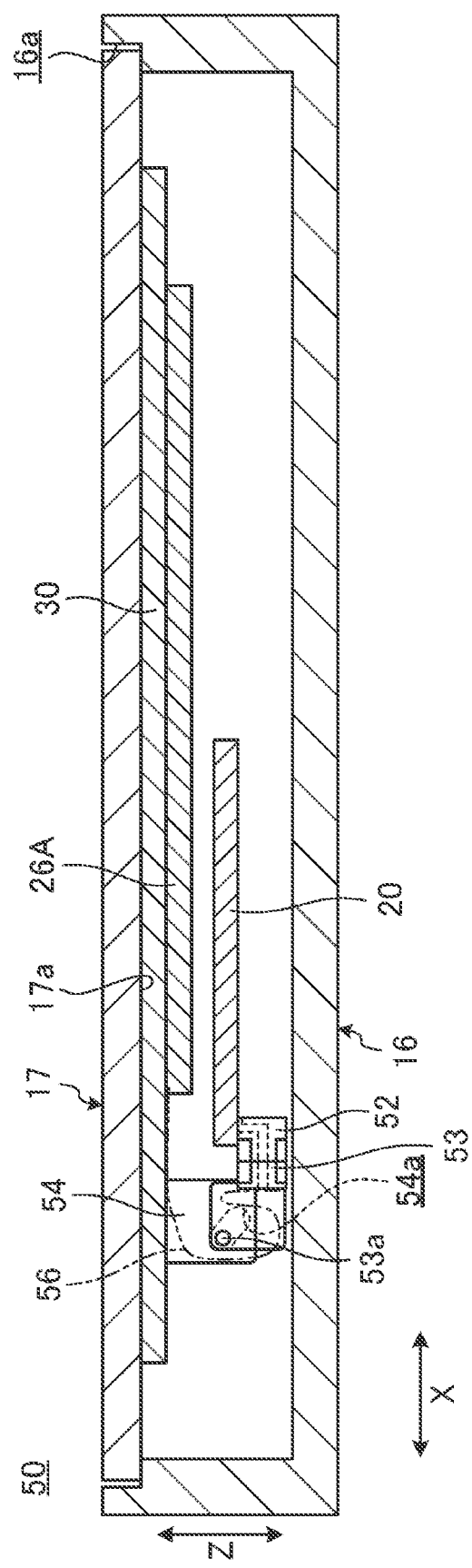
FIG. 8A is a schematic sectional diagram illustrating one example of the electronic apparatus which is taken along the VIII-VIII line in FIG. 7.
Figure 8B:
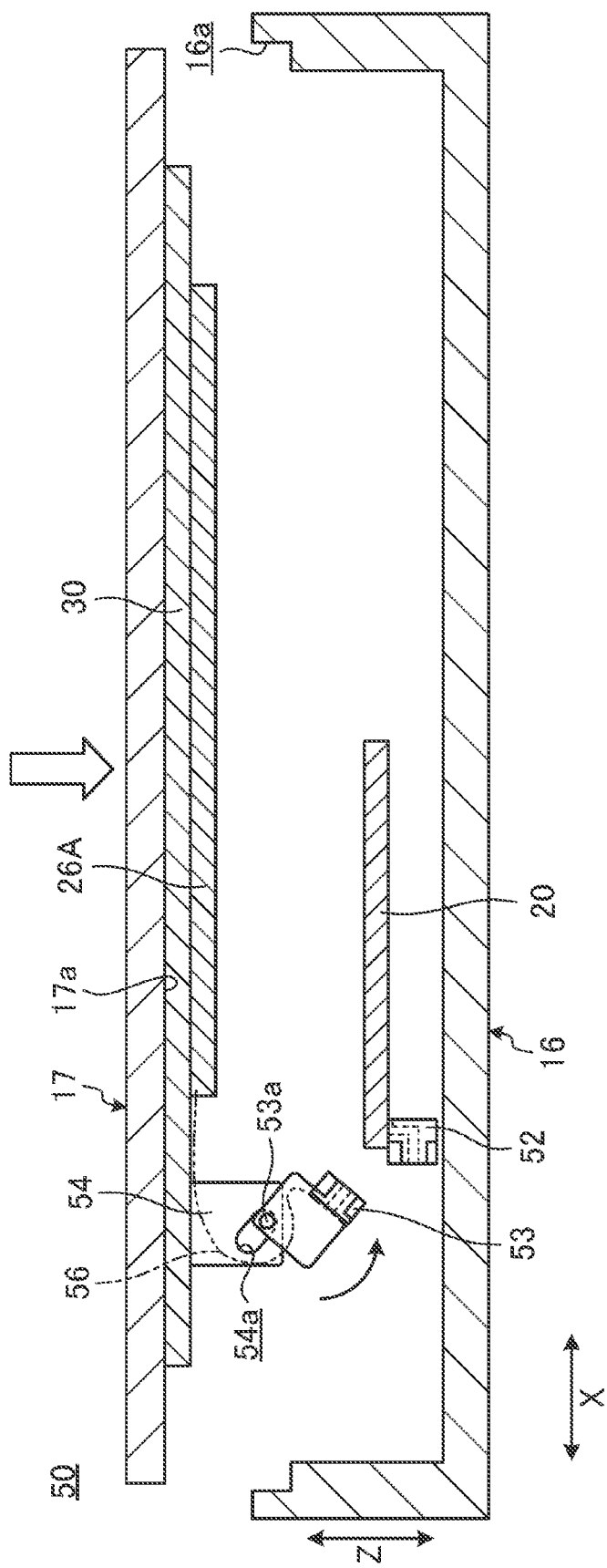
FIG. 8B is an exploded diagram illustrating one example of an operation of attaching a cover member to a housing which is illustrated in FIG. 7A.

FIG. 7 is a schematic diagram illustrating one example of an inner structure of the electronic apparatus 50 according to the second embodiment of the present invention. FIG. 8A is a schematic sectional diagram along the VIII-VIII line in FIG. 7. FIG. 8B is an exploded diagram illustrating one example of an operation of attaching the cover member 17 to the housing 16 which is illustrated in FIG. 7A. In the electronic apparatus 50 according to the second embodiment of the present invention, the same reference numerals are assigned to elements which exhibit functions and effects which are the same as or similar to the functions and effects of the elements of the electronic apparatus 10 (10A) according to the first embodiment of the present invention and detailed description thereof will be omitted. As in the case of the illustrations in FIG. 4 to FIG. 5B, in FIG. 7A and FIG. 7B, concrete illustrations of the display 14 and the vessel 18 are omitted and the display 14 and the vessel 18 are illustrated in a lump as one plate-shaped cover member 17.

The electronic apparatus 50 according to the second embodiment of the present invention includes connectors 52 and 53 which are different from the connectors 25 and 27 of the electronic apparatus 10 (10A) in configuration and connection structure.

First, a support structure for supporting the connector 52 to the housing 16 and a support structure for supporting the connector 53 to the cover member 17 will be described.

As illustrated in FIG. 7 and FIG. 8A, the first board is housed in the housing 16 and is fixed to the housing 16. Accordingly, the first connector 52 which is mounted on the first board 20 is fixed to the housing 16 relatively. In this situation, the first connector 52 is mounted on the lower-face side of the first board 20 in a state of facing the X direction and a leading end (a connection face) thereof protrudes from the end face of the first board 20 sideways. That is, the first connector 25 of the electronic apparatus (10A) is arranged in a state of facing a vertical direction (the Z direction). On the other hand, the first connector 52 of the electronic apparatus 50 is arranged in a state of facing a horizontal direction (the X direction).

The electronic apparatus 50 according to the second embodiment of the present invention includes a control board 26A and a second board 56 in place of the second board 26 of the electronic apparatus 10 (10A).

The control board 26A is the same as the second board 26 and is the board for controlling display on the display 14. The control board 26A is fixed to the cover member 17 relatively via the holder plate 30. A bearing portion 54 is installed on an inner face of a portion of the holder plate 30 which projects from an end face of the second board 26A in the X direction. The bearing portion 54 is configured by one pair of small-sized resinous plates which are arranged in opposition to each other, for example, in the X direction. The second connector 53 is arranged between one pair of the bearing portions 54 and 54. A slot 54a which extends in a direction which is inclined in the X direction relative to the Z direction at an angle of, for example, about 30 to 50 degrees is formed in each bearing portion 54.

The second board 56 is a flexible board (FPC: Flexible printed circuits). A first end of the second board 56 is connected to the control board 26A and the second connector 53 is mounted on a second end of the second board 56.

The second connector 53 is supported by one pair of the bearing portions 54 to be rotationally movable. The second connector 53 has one pair of rotating shafts 53a which projects from both side faces respectively in its width direction (the Y direction). Each rotating shaft 53a is pivotally supported in a state of being relatively movable and relatively rotatable relative to the slot 54a in each bearing portion 54. Thereby, the second connector 53 is supported to the cover member 17 in a floating state. Specifically, the second connector 53 is supported to the cover member 17 in the floating state that relative rotational movement for performing wobbling in the Z direction around the rotating shaft 53a and relative movement in the X and Z directions that the rotating shaft 53a moves along the slot 54a are made possible. Incidentally, since the second connector 53 is connected with the control board 26A via the second board 56 which is the flexible board, a smooth floating operation is secured.

Figure 9A:
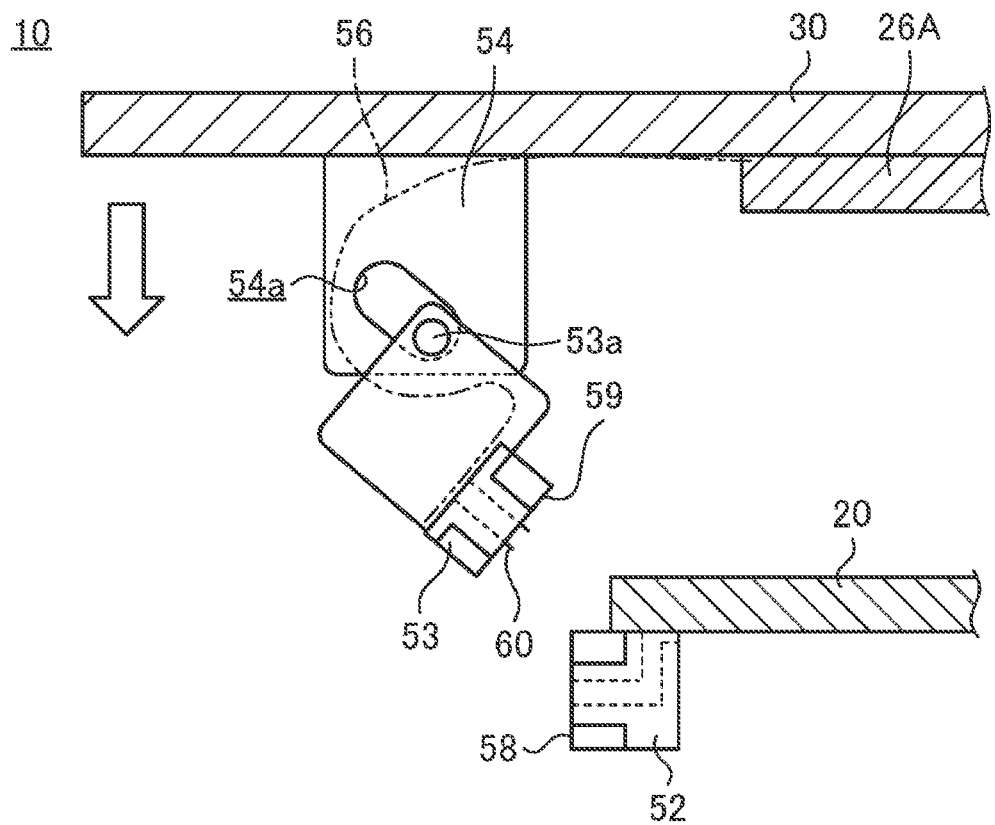
FIG. 9A is an enlarged diagram illustrating one example of the connectors and the peripheral portions thereof which are illustrated in FIG. 8B.
Figure 9B:
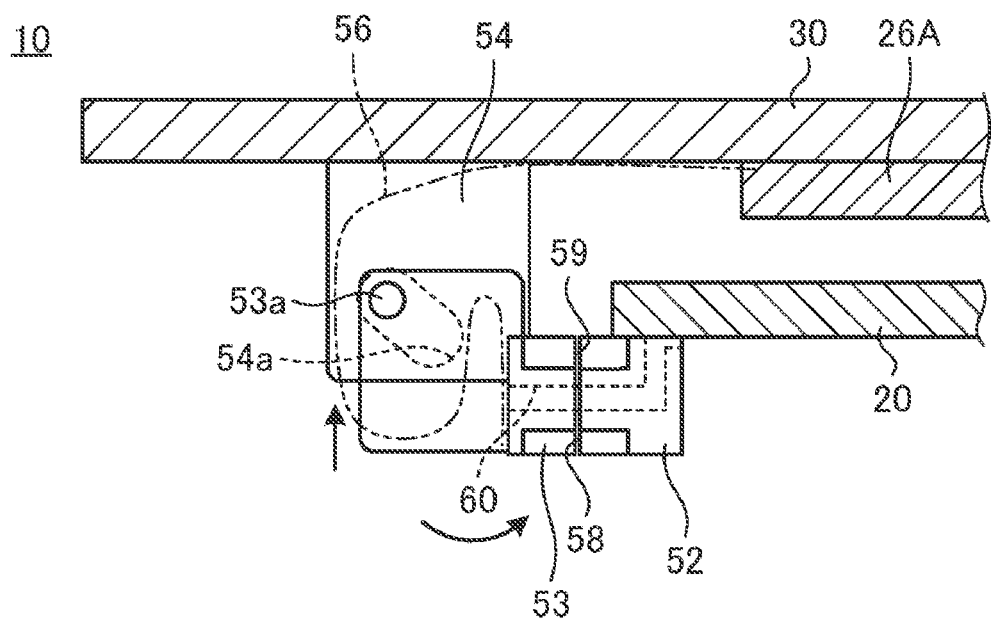
FIG. 9B is an enlarged diagram illustrating one example of the connectors and the peripheral portions thereof which are illustrated in FIG. 8A.

FIG. 9A is an enlarged diagram illustrating one example of the connectors 52 and 53 and their peripheral portions which are illustrated in FIG. 8B. FIG. 9B is an enlarged diagram illustrating one example of the connectors 52 and 53 and their peripheral portions which are illustrated in FIG. 8A.

As illustrated in FIG. 9A and FIG. 9B, the connectors 52 and 53 have a first magnet 58 and a second magnet 59 on their connection faces respectively. The first magnet 58 and the second magnet 59 mutually generate the attraction force. A Pogo pin 60 is installed on a connection face of the second connector 53 in a state of protruding from the connection face to be movable back and forth. The Pogo pin is called a spring-loaded probe or a contact probe, is a contact pin which is retractable from the connection face of the second connector 53 and also serves as a portion for positioning the connectors 52 and 53.

Next, an operation of coupling the cover member 17 to the housing 16 and connecting together the connectors 52 and 53 simultaneously will be described.

FIG. 8B and FIG. 9A each illustrates a state which is observed immediately before the second connector 53 abuts on the first connector 52, when attaching the cover member 17 to the housing 16 from above so as to close the opening 16a in the housing 16. In the electronic apparatus 50, the first connector 52 is so arranged as to face sideways and the second connector 53 is supported in a floating state of being rotatable and movable relative to the cover member 17. Accordingly, as illustrated in FIG. 8B and FIG. 9A, in a state which is taken before the cover member 17 is coupled to the housing 16, the second connector 53 enters a state of being suspended in a posture of facing the lower right side in the drawing under its own weight. In this state, the rotating shaft 53a is located on one end side (the lower right side in the drawing) which is the closest to the first connector 52 in the X direction in the slot 54a.

In a case where the cover member 17 comes closer to the housing 16 from this state, a connection face of the second connector 53 abuts on a connection face of the first connector 52. Then, while the second connector 53 is rotationally moving so as to turn upward in the Z direction around the rotating shaft 53, the rotating shaft 53a moves toward the other end side (the upper left side in the drawing) in the slot 54a. As a result, the second connector 53 is connected with the first connector 52 smoothly without being caught in the first connector 52 and inducing breakage failure and so forth. On this occasion, the connectors 52 and 53 stick together with the aid of the attraction force between the magnets 58 and 59 and the Pogo pin 60 is pressed against a connection terminal of the first connector 60 simultaneously, and thereby the connectors 52 and 53 are mutually positioned and connection between the connectors 52 and 53 is completed.

Also in the electronic apparatus 50, the connectors 52 and 53 are automatically connected together simply by coupling the cover member 17 to the housing 16 in this way. Incidentally, also in the electronic apparatus 50, the housing 16 and the cover member may be clamped together with the screw 44.

As described above, also in the electronic apparatus according to the second embodiment of the present invention, the first connector 52 which is mounted on the first board 20 is fixed to the housing 16 relatively and the second connector 53 which is mounted on the second board 56 is supported to the cover member 17 in the floating state.

Accordingly, in the electronic apparatus 50, in a case where the cover member 17 is coupled to the housing 16, the relative positions between the connectors 52 and 53 are adjusted by the floating operation of the second connector 53 and the connectors 52 and 53 are automatically connected together. That is, in the electronic apparatus 50, the connectors 52 and 53 are connected together simply by coupling the cover member 17 to the housing 16.

Accordingly, also in the electronic apparatus 50, it becomes possible to connect the connectors 52 and 53 together and to couple the cover member 17 and the housing 16 together efficiently with no need of arranging the elongated flexible board between the cover member 17 and the housing 16 in the striding-over state. Further, since there exists no flexible board which is arranged between the cover member 17 and the housing 16 in the striding-over state, in a case where the cover member 17 is detached from the housing 16 at the time of maintenance and so forth, such a situation that the flexible board is damaged does not occur. Incidentally, although the second board 56 is the flexible board, the second board 56 is adapted to connect together components which are supported to the cover member 27, that is, is adapted to connect together the control board 26A and the second connector 53 and is not arranged between the cover member 17 and the housing 16 in the striding-over state.

In the second embodiment, the first connector 52 is arranged in a state of facing in the X direction which intersects with the Z direction which is the direction that the cover member 17 is attached to/detached from the housing 16. In addition, the cover member 17 has a bearing portion 54 and the second connector 53 has the rotating shaft 53a which is supported by the bearing portion 54, and thereby the second connector 53 may be so configured as to be movable and rotatable relative to the cover member 17. Then, in the electronic apparatus 50, it becomes possible to smoothly connect the second connector 53 which is supported on the cover member 17 side also to the first connector 52 which is arranged sideways relative to a direction that the housing 16 and the cover member 17 are coupled together. In particular, in the electronic apparatus 50, a direction that the connectors 52 and 53 are attached/detached is set to the Z direction which is orthogonal to the X direction which is a direction that the magnets 58 and 59 mutually attract. Accordingly, the electronic apparatus 50 also has such an advantage that it becomes possible to smoothly release a mutually attracted state of the magnets 58 and 59 in a case where the cover member 17 is detached from the housing 16. In the electronic apparatus 50, the bearing portion 54 has the slot 54a which supports the rotating shaft 53a and the slot 54a may be also configured to extend in an inclination direction that the second connector 53 is gradually separated from the first connector 52, heading in the Z direction that the cover member 17 is detached from the housing 16. Then, in the electronic apparatus 50, in a case where the cover member 17 is coupled to the housing 16, the rotating shaft 53a moves while rotating in the slot 54a and makes the second connector 53 move in a direction that the second connector 53 moves backward from the first connector 52. Accordingly, in the electronic apparatus 50, smooth connection between the connectors 52 and 53 becomes possible while suppressing such a situation that the second connector 52 is pushed against the first connector 52 by exertion of excessive force and one or both of the connectors 52 and 53 is/are damaged in a case where the connectors 52 and 53 are connected together.

Incidentally, the electronic apparatus 50 may be the laptop PC that the keyboard 46 is loaded on the cover member 17 similarly to the electronic apparatus 10A which is illustrated in FIG. 6.

Incidentally, it goes without saying that the present invention is not limited to the above-described embodiments and it is possible to freely change the configuration of the electronic apparatus within the range not deviating from the gist of the present invention.

The holder plate 30 may be omitted. In this case, in the electronic apparatuses 10 and 10A, the second board 26 may be directly supported by the cover member 17 and the recessed portion 40 and the protruding portion 41 may be formed in/on, for example, each of the boards 20 and 26 to be used as substitutes for the positioning portions 36. In addition, in the electronic apparatus 50, the control board 26A may be directly supported by the cover member 17 and also the bearing portion 54 may be directly installed on the cover member 17.

The second connector (27, 53) is configured to be floatable across a distance which is long to some extent by floating support of the second board 26 to the cover member 17 or by floating support of the second board 26 to the cover member 17 with the use of the rotating shaft 53a. In addition to such floating structures as above, in the electronic apparatus (10, 10A, 50), the second connector (27, 53) may be also configured by a floating connector which minutely floats relative to the second board (26, 56) so that the first connector (25, 52) and the second connector (27, 53) itself are mounted.

The invention claimed is:

1. An electronic apparatus comprising:
    a housing having an opening in one face thereof;
    a cover member detachably coupled to the housing and closes the opening in the housing;
    a first board housed in the housing;
    a second board supported by the cover member;
    a first connector mounted on the first board and fixed to the housing; and
    a second connector mounted on the second board, supported by the cover member in a floating state and connected with the first connector when the cover member is coupled to the housing; wherein
    the first connector faces a direction which intersects with a direction that the cover member is attached to/detached from the housing,
    the cover member has a bearing portion, and
    the second connector has a rotating shaft which is supported by the bearing portion and thereby is allowed to move and rotate relative to the cover member.

2. The electronic apparatus according to claim 1, further comprising:
    an elastic body, wherein
    the second board is supported by the cover member and is configured to provide a gap between the second board and the inner face of the cover member and to freely float along the inner face of the cover member, and the elastic body configured to be in the gap and to actuate the second board in a direction that the second board can be separated from the inner face of the cover member.

3. The electronic apparatus according to claim 2 further comprising:

a first magnet fixed to the first board; and a second magnet fixed to the second board and which can generate an attraction force in a direction that the second connector can be connected with the first connector between the second magnet and the first magnet.

4. The electronic apparatus according to claim 3, further comprising:

a positioning portion configured to position the first connector and the second connector in a direction which is orthogonal to the direction that the second connector is connected with the first connector.

5. The electronic apparatus according to claim 1, wherein the bearing portion has a slot which supports the rotating shaft, and the slot extends in an inclination direction so that the second connector is gradually separated from the first connector.

6. The electronic apparatus according to claim 1, further comprising:

an electronic component which is either a display or a keyboard and is supported by the cover member, wherein the first board is a motherboard to which a CPU is mounted, and the second board is a control board of the electronic component or a flexible board which is connected to the electronic component.

* * * * *